UNITED STATES PATENT OFFICE.

THOMAS TAYLOR, OF GROVE END ROAD, ENGLAND, ASSIGNOR TO EDMUND S. HANNA AND WALDIMER A. SCHMIDT, OF PITTSBURG, PA.

IMPROVEMENT IN THE TREATMENT OF PAPER AND PAPER-PULP.

Specification forming part of Letters Patent No. 114,880, dated March 16, 1871.

*To all whom it may concern:*

Be it known that I, THOMAS TAYLOR, of Warwick House, Warwick Place, Grove End Road, Middlesex, England, have invented an Improvement in the Treatment of Paper and Paper-Pulp; and do hereby declare that the following description forms a full and exact specification of the same, wherein I have set forth the nature and principles of my said improvement, by which my invention may be distinguished from others of a similar class, together with such parts as I claim and desire to secure by Letters Patent—that is to say:

The object of this invention is to prepare paper or paper-pulp (either sized, unsized, or partially sized) in such manner as to produce a change, more or less complete, in the fiber or material of which the paper is composed, whereby the texture and character of the paper are altered. The paper thus treated becomes less porous, acquires increased density, strength, stiffness, and durability, resists the action of water, and may be made to assume, to a greater or less extent, the toughness, semi-transparency, and general appearance of parchment, the peculiar effect thus produced upon paper being, as regards chloride of zinc, a new fact in chemical science.

My invention consists in soaking paper, when dry, in a concentrated neutral, or nearly neutral, solution of chloride of zinc, either at the natural temperature of the air, or moderately heated, and afterward thoroughly washing the paper in water.

The following is the general process I adopt: I take a solution of the salt called chloride or muriate of zinc, and having rendered it as neutral as may be by the addition of oxide or carbonate of zinc, I concentrate the solution by evaporating it until it has acquired, when cold, the consistence of sirup. In this case it will have the specific gravity of 2100 or thereabout. The solution of zinc being thus prepared, I immerse or float upon its surface the paper to be treated until it is fully saturated with the solution. The paper is then withdrawn, and the adhering liquor being removed by a scraper, roller, or any other mechanical means, it is either immediately plunged into water or allowed to remain for a short time until it is apparently dry, then plunged into water and washed therein until all soluble matter is removed. In cases where it is desirable to retain a portion of oxide of zinc in the paper, the paper, after being partially washed, is immersed in a weak solution of a carbonated alkali, and afterward thoroughly washed in water. The paper may then be pressed and dried, and submitted to the ordinary processes for obtaining a smooth or glazed surface, or it may be sized or colored.

After this treatment it will be found that the paper is more or less changed, has contracted in volume, become more dense, and is less porous than before, while, at the same time, it is much stronger. When, however, it is desired that a more complete change should be produced in the paper, the solution of zinc should be moderately heated before immersing the paper, or the paper, after having been drawn through the cold solution, and the adhering liquor removed, should be exposed to a gentle heat. The temperature necessary may be varied from 80° to 90° Fahrenheit to little short of boiling water, according to the effect that is desired to be produced on the paper. It must also be borne in mind in determining the amount of heat to be applied that the kind of paper used, its thickness, density, the strength of the zinc solution, and the length of time during which the paper is exposed to heat, influence the result.

In general I find that when ordinary blotting-paper is used, and the paper is heated by the application of metallic surfaces, a temperature of 120° to 140° Fahrenheit is sufficient. A good criterion of the completion of the change is to be found in the circumstance that the paper becomes somewhat swollen and apparently dry. It also passes from a semitransparent and rather rigid state to one that is more opaque and flaccid.

The heating of the paper may be effected in several ways, first, by bringing the solution of zinc to the required temperature; secondly, by laying the saturated paper upon smooth heated surfaces, or by passing such surfaces over it, as is done in the operation of ironing. When the paper is in the form of a continuous web this may be conveniently effected by passing the paper between heated rollers, or through a hot chamber, as is commonly done in the drying of paper; in fact, the whole operation, from the first plunging the paper into the bath of chloride of zinc to its final washing in water, may be made a continuous process. I do not, however, claim any particular form of apparatus for doing this, as the means are so simple as to be obvious to every mechanic, and are also in ordinary use for various other purposes. I also find that this process may be applied to paper already printed or written upon with common writing ink, whereby both the paper and writing are rendered more durable.

In some cases I dissolve, by the aid of heat, cotton fiber, starch, dextrine, or gum in the concentrated solution of chloride of zinc; or I add to the solution of chloride of zinc the chlorides of tin, calcium, or magnesium prior to using it; but in every case I use the substances in a state of solution, and afterward submit the paper to thorough washing with water.

If sheets of paper, after having been saturated with chloride of zinc, be pressed firmly together, and a warm iron passed over them, the surfaces will become permanently united, and in this way many sheets may be joined together, or vessels formed of one continuous piece.

Having thus described the nature of my said invention, and the manner in which the same is to be performed, I declare that I claim—

The employment of a concentrated solution of chloride of zinc, either alone or mixed with other substances, to sized or unsized paper, and afterward washing the paper in water, substantially in manner and for the purposes hereinbefore described.

In testimony whereof I have signed my name to this specification in the presence of two subscribing witnesses this 3d day of March, 1871.

THOMAS TAYLOR.

Witnesses:
CHAS. D. ABEL,
JNO. BN. MILLARD.